June 19, 1923.
H. VAN SCOY
DUMPING CARGO CARRIER
Filed Oct. 21, 1921
1,459,315
3 Sheets-Sheet 1
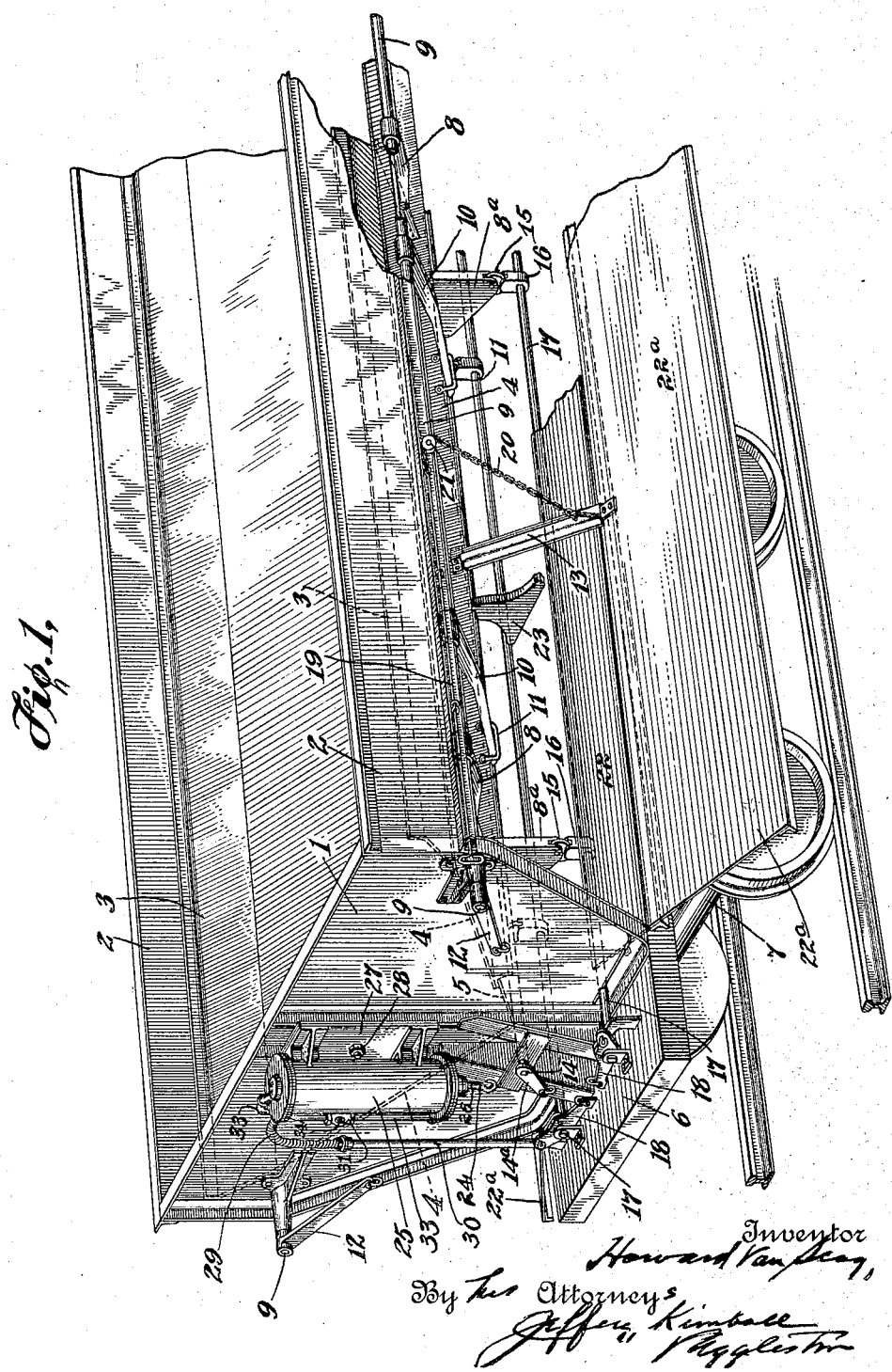

June 19, 1923.
H. VAN SCOY
DUMPING CARGO CARRIER
Filed Oct. 21, 1921
1,459,315
3 Sheets-Sheet 2
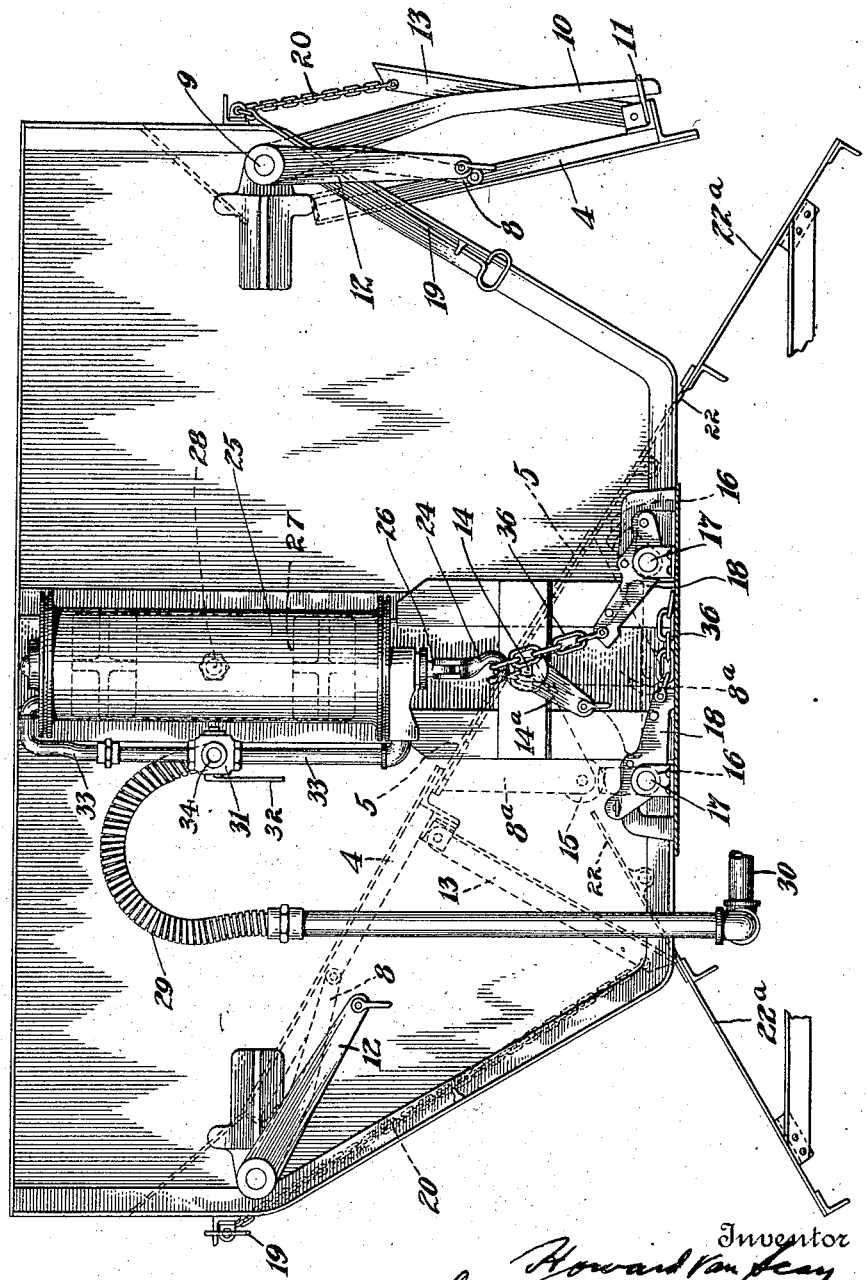

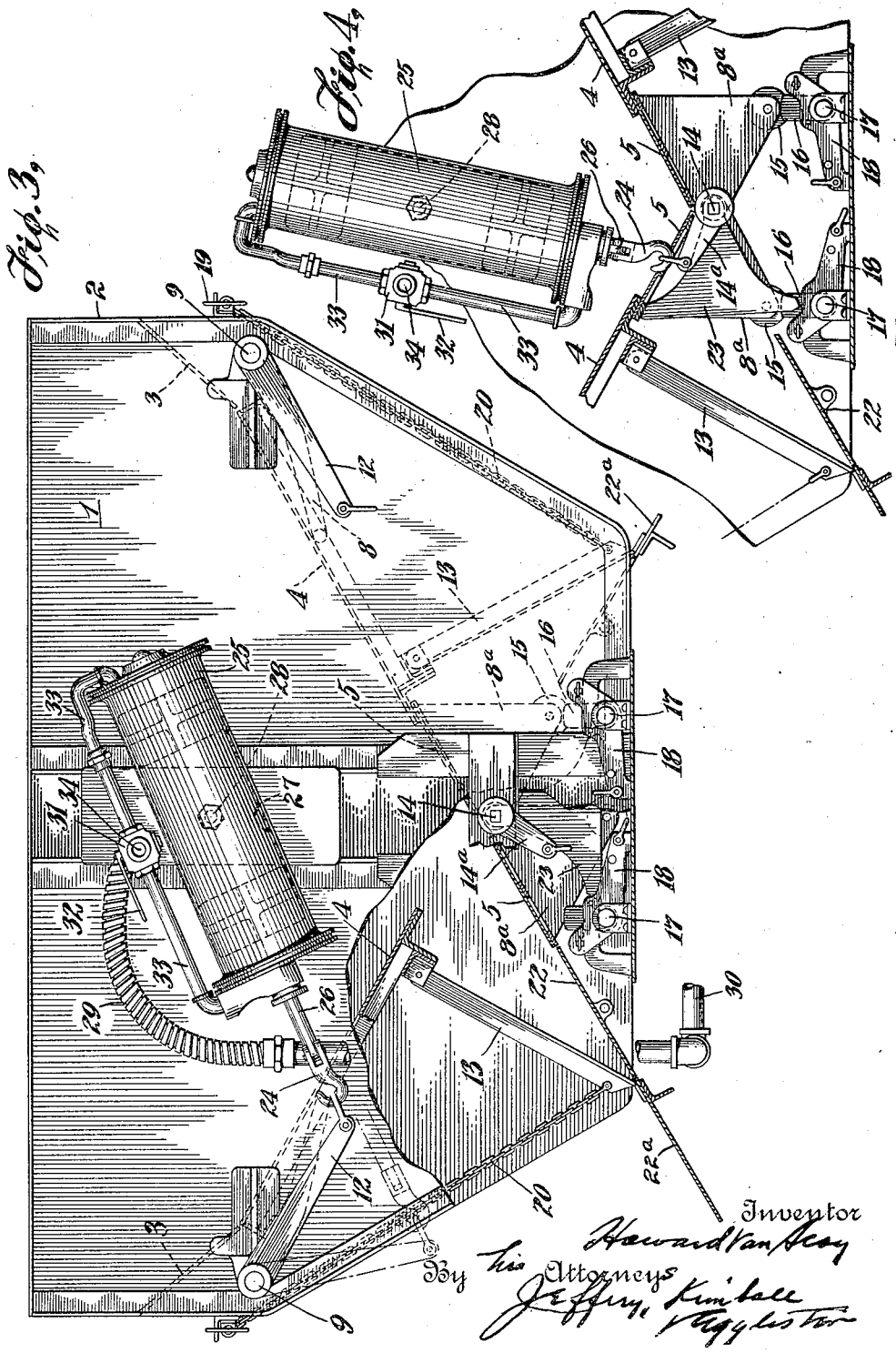

Patented June 19, 1923.

1,459,315

UNITED STATES PATENT OFFICE.

HOWARD VAN SCOY, OF CHICAGO, ILLINOIS, ASSIGNOR TO GOODWIN CAR & MFG. COMPANY, INC., OF WILMINGTON, DELAWARE, A CORPORATION OF DELAWARE.

DUMPING CARGO CARRIER.

Application filed October 21, 1921. Serial No. 509,264.

*To all whom it may concern:*

Be it known that I, HOWARD VAN SCOY, United States citizen, residing in Chicago, Illinois, have invented the following described Improvements in Dumping Cargo Carriers.

Power means, such as compressed air motors and manually operated power multipliers, have been used heretofore for releasing and replacing the dump valves of cargo carriers. The purpose of this invention is to simplify the connecting mechanism customarily interposed between such power means and the valve releasing and replacing devices, the power means of this invention being arranged for substantially direct connection at will to any of these devices for their operation for all purposes. The invention has further and collateral objects as will later appear, being directed to the improvement of the dumping mechanism of cargo receptacles generally but being particularly suited for railway dump cars.

In the accompanying three sheets of drawings, I have shown my invention embodied in a vehicle of the Goodwin dump car type. Fig. 1 is a perspective of one end of the car with the cargo receptacle closed. Fig. 2 is an end elevation of the cargo receptacle showing the parts just after the valves at one side have opened. Fig. 3 is a similar view, partly in section, showing the valves at the opposite side of the car in the act of closing, and Fig. 4 is a sectional detail.

The cargo receptacle shown is mounted on a running gear 7, only partly illustrated because well understood; the receptacle comprises end bulkheads 1, sides 2, a fixed inclined side or floor 3 at each side of the receptacle, and a pair of longitudinal hopper valves 4 and 5 below each inclined side 3 and therewith forming the receptacle bottom. The side or drop valve 4 of each pair is hinged to links 8 swinging loosely on a shaft 9 journalled on the car body underneath the adjacent floor section 3, while the detent valves 5 of both sides of the cargo receptacle swing loosely below the side valves on a single central shaft 14. When in normal load carrying position, the lower end of each side valve 4 rests on its companion detent valve 5 and the latter is held closed from beneath by upstanding supporting detents 16 which are fixed to the detent shaft 17 directly beneath. These supporting detents directly engage antifriction rollers 15 carried on the ends of strut brackets 8ª extending downwardly from the detent valve. By rocking one of the detent shafts 17 therefore so as to displace its detents 16 from beneath the respective roller 15, both valves of the same side of the car are released and allowed to swing outwardly by gravity about their shafts 9 and 14, and the cargo slides out of the receptacle over the fallen detent valve which in its fall is stopped at a suitable inclination for this purpose as shown. It will be understood that both shafts 17 may be rocked simultaneously and the valves released at both sides of the car at the same time. Aprons are arranged lengthwise of the cargo receptacle to conduct the discharging cargo, the upper part of 22 of each apron being hinged in the usual manner either to direct the load between the car wheels or pass the cargo on to a fixed part 22ª of the apron for discharge outside the tracks. In closing the receptacle, the side valve 4 is replaced first. This is done by turning its shaft 9, which has replacer arms 10 fixed to it for the purpose. Suitable means then hold the side valve closed temporarily pending the closing of the corresponding detent valve; a preferred form of means for this purpose consists of a strut or sprag 13 hinged beneath the side valve and arranged to drag over the apron as the side valve closes and seat in a notch or on a cleat on the apron. Shaft 9 may then be released and the detent valve shaft 14 turned in the appropriate direction to cause a replacing arm 23 fixed to it to engage the bottom of the detent valve 5 and lift it into engagement with the edge of the closed side valve, this lifting of the detent valve causing the rollers 15 to turn their supporting detents 16 and shaft 17 sufficiently to allow the rollers to resume their upper positions; the detents and their shaft are then returned to supporting and locking position beneath the detent rollers by gravity or a spring in the usual manner. The replacing arm 23 is so shaped that it may raise either of the detent valves according to the direction in which shaft 14 is turned. Loops 11 on the side valves, serve to hold the replacing arm 10 close to these valves.

For the purposes of my invention the several valve controlling shafts 9, 14 and 17 are extended to a single operating station and the operating motor or other power means is movably mounted at this station so as to be directable toward any one of the control shafts for direct connection thereto, or to exert a straight line pull or push on cranks that are fixed to them. In the case shown these shafts extend through the end bulkhead 1 and are provided with cranks 12 and 14ᵃ and 18 respectively, while the operating motor is mounted centrally thereof on a pivot 28 on a base plate 27 carried by the reenforcing stanchions of the bulkhead. The operating motor is an air cylinder 25 having a piston rod 26 and is connected to a source 30 of compressed air (which may be taken from the air brake system of the car) by means of a flexible hose or pipe 29 and a control valve 31 and pipes 33 by means of which air may be admitted to and exhausted from either end of the cylinder as desired. The exhaust port is marked 34. The cylinder 25 as thus mounted and connected may be turned toward any of the control shafts so that the hook 24 on its piston rod can be connected with any of the shaft cranks, either by directly engaging an eye in the crank (Fig. 3) or through an intermediate link or short chain 36 (Fig. 2).

It will now be apparent that the discharge of a cargo requires merely that the cylinder be turned manually on its pivot 28 so that its piston rod will be directed toward the shaft 17 and that the piston be extended and connected by the hook with either or both of the cranks 18 on those shafts according as the load is to be dumped from one or both sides of the car; admission of air by manipulation of the air valve handle 32 then retracts the piston, thereby turning the releasing shaft or shafts 17 as the case may be and releasing the hopper valves as before described. To replace the valves the air motor is directed toward and used on the shafts 9 and 14 in a similar manner, and in the sequence heretofore pointed out, the employment of suitable means as the sprags 13 to hold the side valves closed temporarily permitting the single power means to be used to close all the hopper valves seriatim. In the construction shown, crank 14ᵃ is detachable from the detent valve shaft 14 so that it may be applied either to the right or to the left to enable the motor to turn it in either direction; obviously other arrangements may be employed to the same end.

In order that all the operating devices of the receptacle may be manipulated from the same operating station, the struts or sprags 13 may also be provided with control devices operable from the same point on the vehicle. For this purpose a jointed longitudinally sliding rod 19 is provided at each side of the receptacle and connected to the sprags 13 by chains 20 passing over sheaves 21 so that when these rods are pulled the sprags are raised. The sprags are held raised by folding the extended rod at its joint and laying it along the end bulkhead and under a catch thereon as shown at the right in Fig. 2.

It will be understood that the invention has no limitation to the number of cargo receptacles, nor to the number of operating stations, on each cargo carrier; nor is there any limitation as to the number of hopper valves that may be employed in each cargo receptacle nor the design and operation thereof, all of which may be extensively varied as will now be apparent although the invention is particularly important in connection with dump cars having pairs of valves on each side of its center line.

I claim:

1. A hopper cargo carrier comprising movable valves, a plurality of releasing and replacing means therefor, and a power means associated with said releasing and replacing means and movably mounted to be directed toward each of said means to exert a substantially straight line operating effort thereon.

2. A hopper cargo carrier comprising movable valves, a plurality of releasing and replacing means therefor, and power means provided with a single member for direct connection to each of said releasing and replacing means and adapted to exert a straight line operating effort thereon.

3. The combination in a dumping cargo carrier, of a number of valve controlling shafts accessible from a single operating station, a power device at said station substantially centrally located with respect to said shafts, a mounting for said device permitting it to be turned toward each shaft, and means for selectively connecting it to each shaft to operate the same.

4. A hopper cargo receptacle comprising end bulkheads, swinging valves extending longitudinally of the receptacle, an operating cylinder and piston outside one of said end bulkheads, shafts controlling said valves and extending beyond said bulkhead round about said cylinder, and cranks on the shafts outside the bulkhead, the cylinder being mounted on a horizontal pivot so as to swing toward each of said cranks for substantially direct operating connection therewith.

5. A hopper cargo receptacle comprising swinging valves extending longitudinally of the receptacle, one valve when closed holding another in closed position, a single power means for closing the two valves seriatim, and means for temporarily holding the second mentioned valve in closed position until the first mentioned valve is closed, thereby permitting said power means to release the second mentioned valve when closed and close the said first mentioned valve.

6. A hopper cargo receptacle comprising swinging side and detent valves extending longitudinally of the vehicle, the detent valve when closed holding the side valve in closed position, means for closing the two valves seriatim, a sprag on the side valve for holding it in closed position until the detent valve is closed, means at the end of the receptacle for operating the valves, and means at the same end of the receptacle for removing the sprag from said holding position.

7. A hopper cargo receptacle comprising end members, a side valve, a detent valve, a shaft controlling the locking of the detent valve in closed position, a shaft for closing each valve, operating cranks for the shafts disposed outside one of the end members, and a single motor means for operating said cranks adapted to swing for substantially direct connection with each.

In testimony whereof, I have signed this specification.

HOWARD VAN SCOY.